Oct. 20, 1925.
G. N. SIMPSON
1,558,121
AUTOMATIC SKIP LOADING GATE
Filed June 25, 1924   2 Sheets-Sheet 1
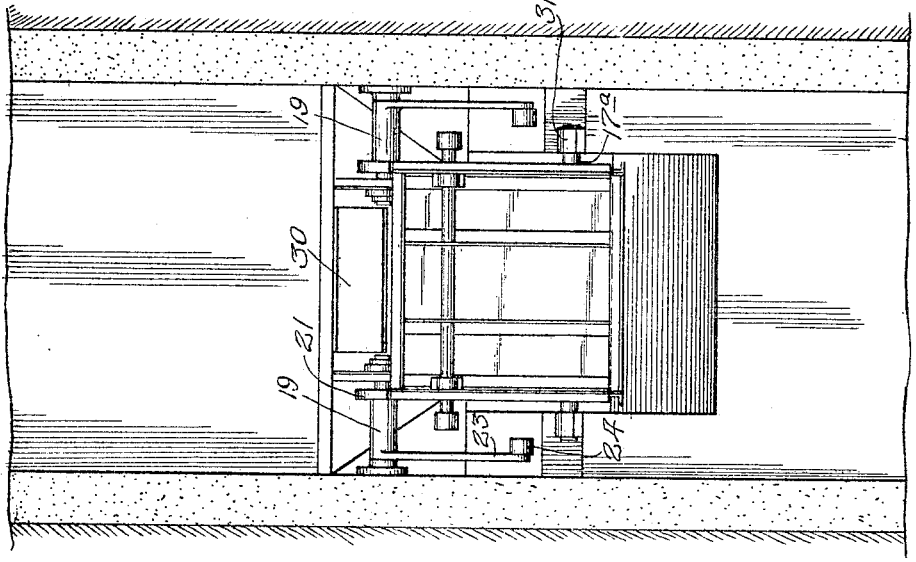
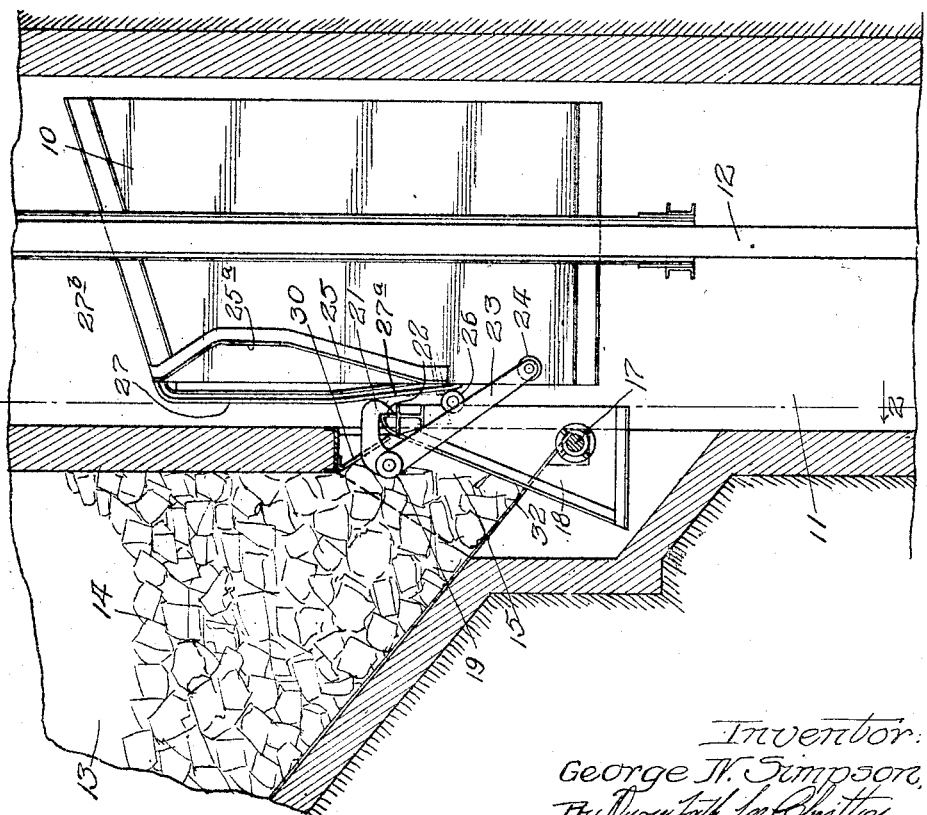
Inventor:
George N. Simpson,

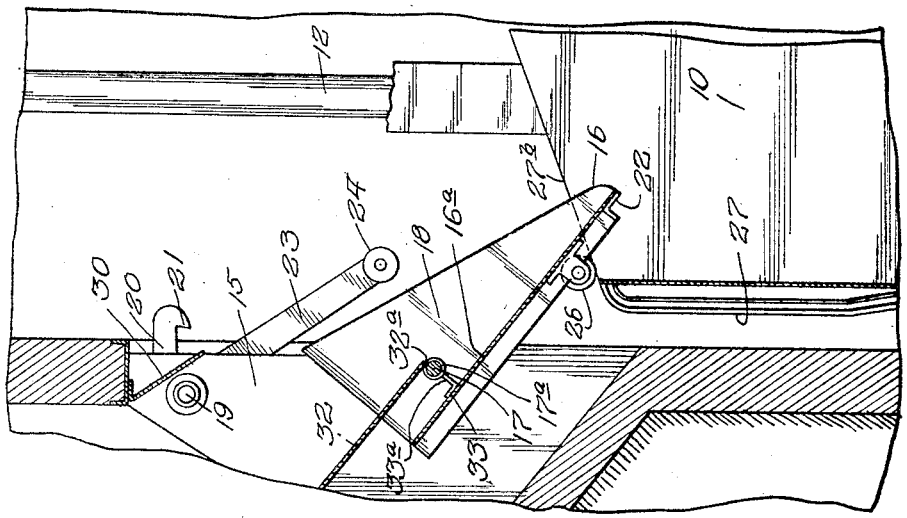
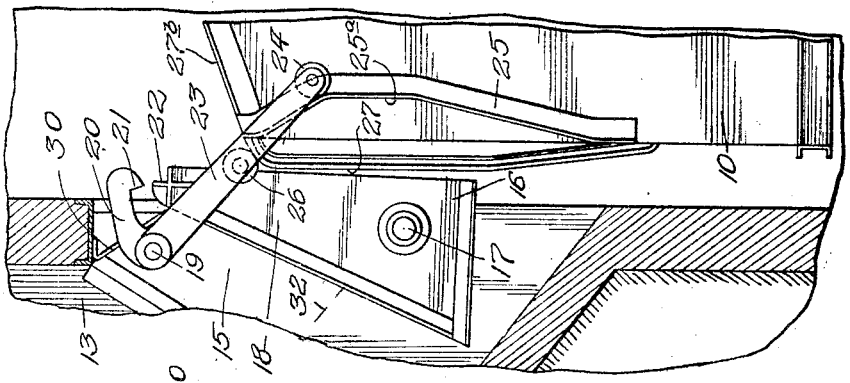
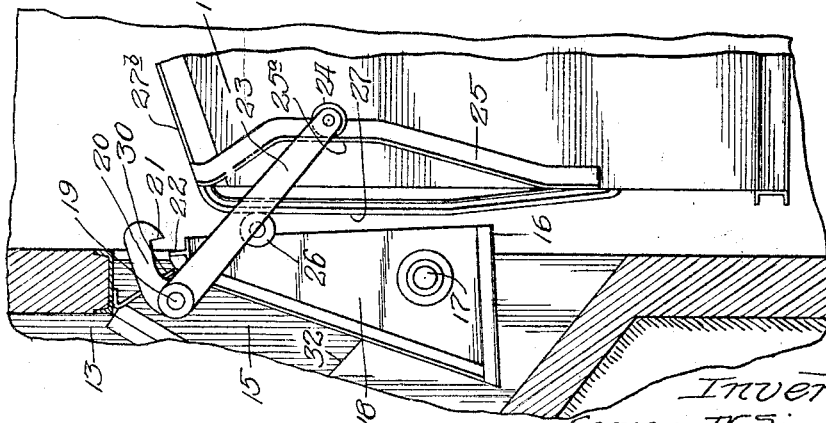

Patented Oct. 20, 1925.

1,558,121

UNITED STATES PATENT OFFICE.

GEORGE N. SIMPSON, OF CHICAGO, ILLINOIS.

AUTOMATIC SKIP-LOADING GATE.

Application filed June 25, 1924. Serial No. 722,291.

*To all whom it may concern:*

Be it known that I, GEORGE N. SIMPSON, a citizen of the United States, residing at 1220 East 75th Street, Chicago, in the county of Cook and State of Illinois, have invented a new and useful Improvement in Automatic Skip-Loading Gates, of which the following is a specification.

This invention relates to improvements in skip loading gates; and is here shown as especially adapted for controlling the flow of material such as coal from a hopper or bin into a skip.

Among the features of my invention is the provision of a gate which is locked in the closed position by hooks which are automatically unlocked when the skip comes down the shaft, thus permitting the gate to roll up the side of the skip and over the top permitting material to flow from the hopper or bin into the skip with practically no spillage. My improved gate is strong and rugged and cheap to construct. Its operation is simple and sure. Other features and advantages of my invention will appear more fully as I proceed with my specification.

Although the invention is here shown as embodied in a device adapted for use in connection with a vertically movable skip, it is obvious that the same invention may be embodied in devices of different forms, for example, the same gate may be used for filling a skip operating in an inclined shaft.

In that form of device embodying the features of my invention shown in the accompanying drawings, Figure 1 is a view in side elevation of the loading gate showing also the skip or bucket, Fig. 2 is a view taken as indicated by the line 2 of Fig. 1, and Figs. 3, 4 and 5 are views similar to Fig. 1 showing the parts in altered positions.

As shown in the drawings, 10 indicates a vertically movable skip or bucket adapted to operate in the shaft 11 and guided by the usual guides 12. 13 indicates a hopper, bin, or any suitable container in which is placed, in any suitable manner, a quantity of material 14, as, for example, coal, sufficient to fill the skip 10 or give it one load. I have not shown any means for placing in the hopper 13 the charge of material, as such means forms no part of the present invention. It is to be understood, however, that there is placed in the hopper 13, in any suitable manner, at one time, just enough material 14 to give the skip 10 one load.

The bin or hopper 13 is provided with a mouth or opening 15 arranged slightly above the skip 10 when it is in its lowest position as shown in Fig. 5.

The opening 15 is adapted to be closed or opened by means of a gate 16 pivoted at 17 and of sufficient length to close the mouth 15 when it is in its vertical or closed position as shown in Fig. 3. When in its open position, the gate 16, as shown in Fig. 5, is down so that the mouth of the bin 15 is uncovered, and the gate also extends from the lower part of the mouth 15 on an incline over the top of the skip, thus acting as a chute to convey the material from the mouth of the bin and direct the same into the skip. The gate 16 is also provided with sides 18 to assist in preventing spillage of material as it flows from the bin into the skip.

I will now describe the means for automatically opening, closing, locking and unlocking the gate.

Near the top of the mouth 15 are rotatably mounted two short shafts 19. Each of these shafts, at its inner end, carries a short arm 20 provided with a hook 21 adapted to engage a projection 22 on the end of the gate when it is in its closed position. Each of the shafts 19 is also provided with a longer arm 23 having at its end a roller 24 adapted to be engaged by the bent angle iron strip or cam 25 on the skip. The angularity of the arms 23 and 20 is so arranged, and the parts are so proportioned, that engagement of the roller 24 with the strip 25 on the skip serves to raise or lower the arm 20 and lock or unlock the hook 21 from the projection 22. The strip or cam surface 25 is so bent that when the skip is up above the roller 24 as shown in Fig. 1, the hook 21 will be in engagement with the part 22 and the gate locked in its closed position. It is to be understood that the two hooks 21, one on each side of the gate, operate in the same manner, and consequently I am describing in detail but one. As the skip descends, the strip 25 engages the roller 24, thus moving it to the right (as viewed in Figs. 1, 3, 4 and 5). This movement rocks the shaft 19 in a counter-clockwise direction as viewed in the same figures, thus raising the hook 21 and unlocking it from the projection 22. When the hooks 21 are thus unlocked, the gate, by gravity, and under pressure of material behind it, is free to swing down into its open position except as such opening is prevented by means to be hereinafter described.

The gate 16 is also provided with a pair of antifriction rollers 26 adapted to engage the rails 27 on the front of the skip 10. These rails, at their lower ends, are slanting, as indicated by 27$^a$. It is to be noted that as the skip descends, the lower ends of the rails 27$^a$ engage the rollers 26 before the rollers 24 are engaged by the angle irons 25. The rails 27 are slanted forwardly a sufficient amount so that their engagement, at their lower ends, as indicated by 27$^a$, with the rollers 26, serves to press the upper end of the gate 16 a slight distance back or in against the pressure of the material behind it. This movement of the gate removes all pressure between the projections 22 and the hooks 21. This feature is very important, because by thus removing the strain on the hooks 21, their unlocking, by engagement of the rollers 24 with the irons 25, is very much facilitated. Further descent of the skip 10 finally brings the strips 25 into engagement with the rollers 24, thus raising the hooks 21 as above described. The skip is shown in this position in Fig. 3, where it is to be noted that the gate has been pressed back by contact of the rollers 26 with the rails 27, and the hooks 21 have also been raised to their unlocked position.

Upon further descent of the skip 10, the rollers 26 roll up on top of the skip and the gate is allowed to swing down into its open position as shown in Fig. 5. The offset part 25$^a$ of the angle irons 25 is of sufficient length to engage the rollers 24 and hold the hooks 21 raised long enough for the projections 22 on the upper end of the gate to swing out and clear the hooks so that the gate, upon further descent of the skip, is permitted to swing down into its open position.

In the upward movement of the skip, the operations are reversed. That is, the contact of the upper edge 27$^b$ of the skip, against the rollers 26, serves to raise the gate. Further upward movement of the skip, causes the rollers 26 to roll over the rails 27, thus forcing the gate back into its closed position, and slightly beyond so that as the hooks 21 fall, they will clear the projections 22. Further upward movement of the skip 10 then permits the rollers 24 to move down on the slanting part of the angle irons 25 so that the hooks 21 drop into their locked position. Further upward movement of the skip finally releases the rollers 26 from the rails 27, whereupon the upper end of the gate moves outwardly a slight distance until the projections 22 engage the hooks 21. The gate is then held by the hooks 21 in its closed position.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

The space above the gate 16 is closed by a plate 30 fastened at the top of the discharge opening 15. It is to be noted that the gate 16 is pivoted at 17 on a hollow shaft 17$^a$ extending entirely across the width of the discharge opening 15 and having its ends supported in the bearings 31. The hollow shaft 17$^a$ is a short distance above the bottom 16$^a$ of the gate. At the bottom of the discharge opening 15 is arranged a chute 32 on a downward slant having its forward end 32$^a$ terminating flush with the hollow shaft 17$^a$. Mounted on the bottom 16$^a$ of the gate 16 just below the hollow shaft 17$^a$ is an angle iron 33 having one of its flanges 33$^a$ acting as a filler plate to fill up the space between the bottom 16$^a$ of the gate and the hollow shaft 17$^a$. It will be seen that by means of this construction, when the gate is pivoted, the filler plate 33$^a$ will swing about the hollow shaft 17$^a$ thus at all times filling up the space between the bottom plate 16$^a$ and the hollow shaft 17$^a$. The end of the chute 32 terminating flush with the hollow shaft 17$^a$ prevents the escape of material between the shaft and the end of this chute. By means of this construction, the hinge is dust-tight and still cannot be caused to bind or jam by any accumulation of fine material around the hinge. Fine coal dust, rock, slate, and other similar materials and also sticky material can be handled in a device of this kind with such a hinge without any injury to the hinge and without any jamming or binding of the same.

What I claim as new, and desire to secure by Letters Patent, is:

1. In apparatus of the character set forth: the combination of a skip; a hopper provided with a discharge opening located adjacent to the path of movement of the skip; a gate pivoted at the lower edge of the discharge opening, said gate projecting beyond the front wall of the hopper when in its lowered or open position and adapted to be raised to a position closing said discharge opening; means for locking the gate in its closed position; and means whereby downward movement of the skip across the opening operates first to press the gate back out of contact with the locking mechanism, then unlock the locking mechanism and then permit the gate to swing outwardly and downwardly to open position.

2. In apparatus of the character set forth; the combination of a skip; a hopper provided with a discharge opening located adjacent to the path of movement of the skip; a gate pivoted at the lower edge of the discharge opening, said gate projecting beyond the front wall of the hopper when in its lowered or open position and adapted to be raised to a position closing said discharge opening; a locking hook adapted to engage a part on the gate to hold the same in closed position; a part on the gate adapted to be engaged by a part on the skip in its downward movement to move said gate to cause the part on the gate in engagement with the locking hook to be moved back away therefrom; and means whereby downward movement of said skip is adapted to raise said locking hook to unlocked position, said means arranged to operate only when said gate is held back so that said locking hook is out of engagement with the part on the gate.

3. In apparatus of the character set forth; the combination of a skip; a hopper provided with a discharge opening located adjacent to the path of movement of the skip; a gate pivoted at the lower edge of the discharge opening, said gate projecting beyond the front wall of the hopper when in its lowered or open position and adapted to be raised to a position closing said discharge opening; a locking hook on a pivoted shaft adapted to engage a part on the gate to hold the same in closed position; an arm on the shaft carrying the locking hook having a roller on its end adapted to be engaged by a cam surface on the skip whereby downward movement of the skip is adapted to rock said shaft to move said locking hook to unlocked position; and a roller on the gate adapted to be engaged by a rail on the skip whereby downward movement of the skip operates to move the upper end of the gate back to move the part thereon in engagement with the locking hook back away from said locking hook and out of contact therewith.

4. In apparatus of the character set forth; the combination of a skip; a hopper provided with a discharge opening located adjacent to the path of movement of the skip; a gate pivoted at the lower edge of the discharge opening, said gate projecting beyond the front wall of the hopper when in its lowered or open position and adapted to be raised to a position closing said discharge opening; a locking hook on a pivoted shaft adapted to engage a part on the gate to hold the same in closed position; an arm on the shaft carrying the locking hook having a roller on its end adapted to be engaged by a cam surface on the skip whereby downward movement of the skip is adapted to rock said shaft to move said locking hook to unlocked position; and a roller on the gate adapted to be engaged by a rail on the skip whereby downward movement of the skip operates to move the upper end of the gate back to move the part thereon in engagement with the locking hook back away from said locking hook and out of contact therewith, said rail and cam surface being so arranged that in the downward movement of the skip the gate is first pressed back and the locking hook then raised.

5. In apparatus of the character set forth: the combination of a load receiving receptacle; a load discharging receptacle provided with a discharge opening; a gate pivoted at the lower edge of the discharge opening, said gate projecting beyond the front wall of the receptacle when in its lowered or open position and adapted to be raised to a position closing said discharge opening; means for locking the gate in its closed position; and means whereby relative downward movement of the load receiving receptacle with respect to the discharge opening operates first to press the gate back out of contact with the locking mechanism, then unlock the locking mechanism and then permit the gate to swing outwardly and downwardly to open position.

6. In apparatus of the character set forth; the combination of a load receiving receptacle; a load discharging receptacle provided with a discharge opening; a gate pivoted at the lower edge of the discharge opening, said gate projecting beyond the front wall of the receptacle when in its lowered or open position and adapted to be raised to a position closing said discharge opening; a locking hook adapted to engage a part on the gate to hold the same in closed position; a part on the gate adapted to be engaged by a part on the load receiving receptacle in relative downward movement of said load receiving receptacle to move said gate to cause the part on the gate in engagement with the locking hook to be moved back away therefrom; and means whereby relative downward movement of said load receiving receptacle is adapted to raise said locking hook to unlocked position, said means arranged to operate only when said gate is held back so that said locking hook is out of engagement with the part on the gate.

7. In apparatus of the character set forth; the combination of a load receiving receptacle; a load discharging receptacle provided with a discharge opening; a gate pivoted at the lower edge of the discharge opening, said gate projecting beyond the front wall of the receptacle when in its lowered or open position and adapted to be raised to a position closing said discharge opening; a locking hook on a pivoted shaft adapted to engage a part on the gate to hold the same in closed position; an arm on the shaft carrying the locking hook having a roller on its end adapted to be engaged by a cam surface on the load receiving receptacle whereby relative downward movement of the load receiving receptacle is adapted to rock said shaft to move said locking hook to unlocked position; and a roller on the gate adapted to be engaged by a rail on the load receiving receptacle whereby relative downward movement of said load receiving receptacle operates to move the upper end of the gate back to move the part thereon in engagement with the locking hook back away from said locking hook and out of contact therewith.

8. In apparatus of the character set forth: the combination of a load receiving receptacle; a load discharging receptacle provided with a discharge opening; a gate pivoted at the lower edge of the discharge opening, said gate projecting beyond the front wall of the receptacle when in its lowered or open position and adapted to be raised to a position closing said discharge opening; a locking hook on a pivoted shaft adapted to engage a part on the gate to hold the same in closed position; an arm on the shaft carrying the locking hook having a roller on its end adapted to be engaged by a cam surface on the load receiving receptacle whereby relative downward movement of the load receiving receptacle is adapted to rock said shaft to move said locking hook to unlocked position; and a roller on the gate adapted to be engaged by a rail on the load receiving receptacle whereby relative downward movement of the load receiving receptacle operates to move the upper end of the gate back to move the part thereon in engagement with the locking hook back away from said locking hook and out of contact therewith, said rail and cam surface being so arranged that in the relative downward movement of the load receiving receptacle the gate is first pressed back and the locking hook then raised.

9. A hopper with a discharge opening; a gate pivoted at the lower edge of the discharge opening, said gate projecting beyond the front wall of the hopper when in its lowered or open position and adapted to be raised to a position closing said discharge opening, said gate having a bottom plate and being pivoted on a transverse shaft arranged a short distance from said bottom plate; a chute at the bottom of the discharge opening terminating flush with said shaft; and a filler plate attached to the bottom plate of the gate and filling the space between the bottom plate of the gate and said shaft.

10. A hopper with a discharge opening; a gate pivoted at the lower edge of the discharge opening, said gate projecting beyond the front wall of the hopper when in its lowered or open position and adapted to be raised to a position closing said discharge opening, said gate having side plates and a bottom plate and being pivoted on a transverse shaft extending through the side plates and lying a short distance from the bottom plate of said gate; a chute at the bottom of the discharge opening terminating flush with said shaft; and a filler plate attached to the bottom plate of the gate and filling the space between the bottom plate of the gate and said shaft.

11. A hopper with a discharge opening; a gate pivoted at the lower edge of the discharge opening, said gate projecting beyond the front wall of the hopper when in its lowered or open position and adapted to be raised to a position closing said discharge opening, said gate having a bottom plate and being pivoted on a transverse shaft arranged a short distance from said bottom plate; a chute at the bottom of the discharge opening terminating flush with said shaft; and a filler plate attached to the gate and filling the space between the bottom plate of the gate and said shaft.

12. A hopper with a discharge opening; a gate pivoted at the lower edge of the discharge opening, said gate projecting beyond the front wall of the hopper when in its lowered or open position and adapted to be raised to a position closing said discharge opening, said gate having side plates and a bottom plate and being pivoted on a transverse shaft extending through the side plates and lying a short distance from the bottom plate of said gate; a chute at the bottom of the discharge opening terminating flush with said shaft; and a filler plate attached to the gate and filling the space between the bottom plate of the gate and said shaft.

Witness my hand and seal this 23 day of A. D. 1924.

GEORGE N. SIMPSON. [L. S.]